(No Model.)

H. TABOR.
FLUID BRAKE VALVE.

No. 518,289.　　　　　　　　　Patented Apr. 17, 1894.

Witnesses:
M. S. Belden
P. P. Sheehan

Harris Tabor　Inventor
by James W. See　Attorney

UNITED STATES PATENT OFFICE.

HARRIS TABOR, OF ELIZABETH, NEW JERSEY.

FLUID-BRAKE VALVE.

SPECIFICATION forming part of Letters Patent No. 518,289, dated April 17, 1894.

Application filed January 8, 1892. Serial No. 417,362. (No model.)

*To all whom it may concern:*

Be it known that I, HARRIS TABOR, of Elizabeth, Union county, New Jersey, have invented certain new and useful Improvements in Fluid-Brake Valves, (Case B,) of which the following is a specification.

This invention pertains to improvements in the valve system of fluid pressure brakes, and will be readily understood from the following description taken in connection with the accompanying drawings, in which—

Figure 1:
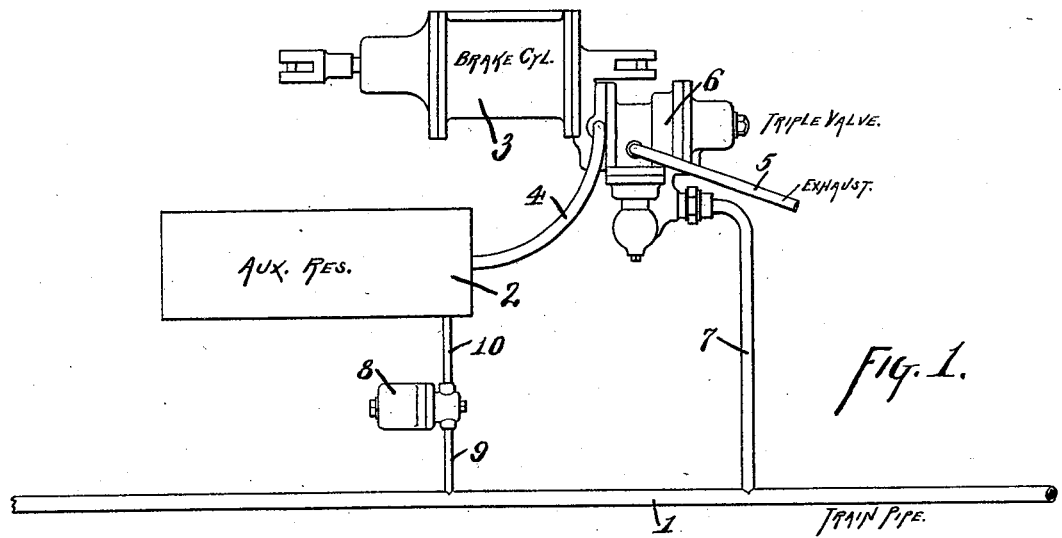
Figure 2:
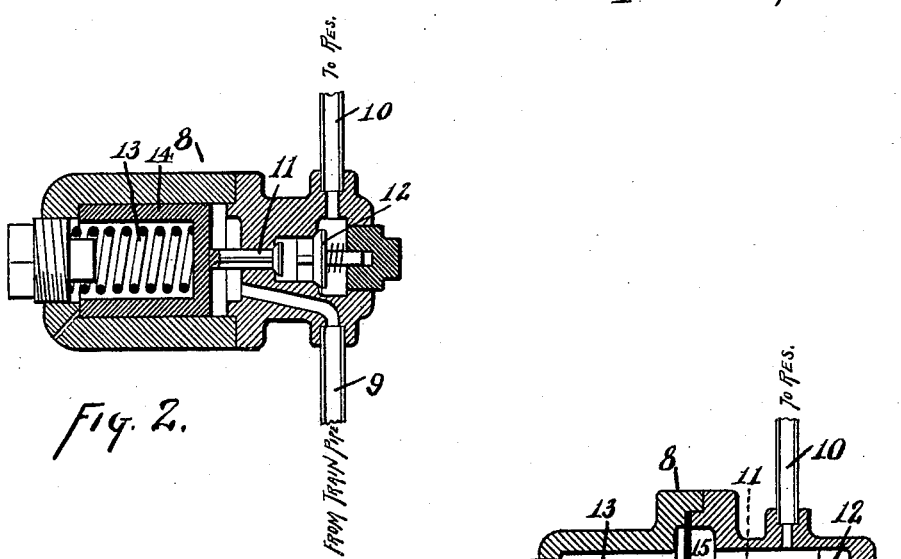

Figure 1, is an elevation of the main parts constituting the usual fluid pressure brake equipment of a single car, and embodying also an exemplification of my present improvement; Fig. 2, a vertical section of the exemplifying form of secondary feed valve; and Fig. 3, a similar section of a secondary feed valve, similar to that shown in Fig. 2, but illustrating certain modifications.

It will be presumed that the reader of this specification is familiar with automatic air brakes, such as are in common use.

In the drawings:—1, indicates the train-pipe; 2, the auxiliary reservoir which is secured under the car and which is to contain the supply of air under pressure; 3, the brake-cylinder which is secured under the car, and which constitutes the engine for applying the brakes, this engine receiving its supply of compressed air from the auxiliary reservoir; 4, feed-pipe, to conduct the air from the auxiliary reservoir to the brake-cylinder; 5, exhaust-pipe, through which the brake-cylinder exhausts its air upon release; 6, triple-valve, controlling the flow of air from the train-pipe to the reservoir and from the auxiliary reservoir to the brake-cylinder, and from the brake-cylinder, this valve operating by virtue of relative pressures in train-pipe and auxiliary reservoir; and 7, feed-pipe from train-pipe to triple-valve, this pipe constituting, when the triple-valve is in normal position, a continuation of feed-pipe 4, whereby air is allowed to pass from the train-pipe to the auxiliary reservoir. All these parts may be precisely as usual and, before proceeding with any description of my present invention, it will be well to consider the usual operation of the parts thus far referred to.

Normally the brakes are off; the brake-cylinder is idle and empty of air under pressure; the triple-valve in such position that the auxiliary reservoir is in free communication with the train-pipe; and the train-pipe and auxiliary reservoir charged with air at standard pressure. If, now, the pressure in the train-pipe be reduced, as by the usual manipulation of the engineer's valve, the preponderating pressure in the auxiliary reservoir, acting on the triple-valve, will throw that valve to a new position so as to cut off communication between the auxiliary reservoir and train-pipe and establish communication between the auxiliary reservoir and brake-cylinder, whereupon air from the auxiliary reservoir goes to the brake-cylinder and the brakes become applied. When this takes place, the air in the auxiliary reservoir expands into the brake-cylinder and more or less leakage at once begins and, in any event, the pressure in the auxiliary reservoir becomes lowered. The brakes will remain applied so long as the position of the triple-valve remains unchanged and so long as leakage does not too far lower the pressure of the air in the auxiliary reservoir and brake-cylinder. To release the brakes the pressure is restored in the train-pipe, by the usual engineer's operations. The preponderating pressure of the train-pipe will then restore the triple-valve to normal position, cutting off communication between the brake-cylinder and auxiliary reservoir, and opening the exhaust of the brake-cylinder, and establishing communication between the train-pipe and auxiliary reservoir, whereupon the reservoir becomes recharged from the train-pipe and the apparatus goes into condition for a new application of the brakes when needed. Upon the release of the brakes time is required in which to restore the pressure in the auxiliary reservoir. If a second application of the brakes is called for quickly after release, there may not have been time in which to restore the auxiliary reservoir to proper pressure. There would then be a deficiency of braking power, more or less serious. If several applications of the brakes are called for in comparatively quick succession, each succeeding application may find the pressure still further lowered in the auxiliary reservoir. Each succeeding application is therefore weaker and finally the deficiency of air in the auxiliary reservoir may be so great as to preclude the proper application of the brakes at all. Serious accidents have happened from this loss of air. Again, as soon as the brakes are applied, more or less leakage begins to take place at the brake-cylinder and the pressure of application is therefore constantly lessening. In descending long grades this is a very serious matter, for the braking power may give out entirely when most needed. So serious and certain is this evil that on some roads with long grades it is the custom, before beginning the descent of the grade, to so manipulate certain appliances which are provided as to cut out the automatic feature and establish direct connection between the train-pipe and the brake-cylinder, whereby the brakes may be kept applied by maintaining pressure in the train-pipe, in short, changing the system from an automatic system to a "straight air" system. At the foot of the grade the automatic system is restored. In the absence of the provision just referred to, a remedy is sought in throttling the exhaust of the brake cylinder by means of a loaded discharge-valve provided upon the exhaust of the brake cylinder, this valve being provided with a cock by means of which the valve may be brought into action. Before starting down the grade the cock is turned, so as to bring the valve into action, and the consequence is that air under limited pressure is penned up in the brake-cylinder even after the triple-valve moves to recharging position, thus permitting the restoration of pressure in the train-pipe for the purpose of recharging the auxiliary reservoir, the cock being turned to normal position, to give free exhaust, when the foot of the grade has been reached. This valve is known as the retaining valve. It is at best but a poor remedy for the evil, as it maintains the applied brakes only under light pressure which is constantly lessening by leakage and as the system requires that the cock under each car shall be manipulated once at the top of the grade and again at the foot of the grade, a matter of such serious inconvenience as to be much liable to neglect with consequent risks. A serious evil is therefore seen to exist in the general system by reason of the lowering of the braking pressure, by reason of long continued application of brakes, or by reason of quick succession of applications, and of automatic air-brakes by reason of the inability to recharge the auxiliary reservoir while the brakes are properly applied, the raising of the pressure in the train-pipe, for the purpose of recharging the auxiliary reservoir, acting to shift the triple-valve and release the brakes, except as provided for, to a limited degree, by the usual retaining-valve.

My invention provides for recharging the auxiliary reservoir while the brakes are held applied by whatever pressure may be in the auxiliary reservoir, and I will now describe an exemplifying structure for carrying out my invention.

Referring further to the drawings:—8, indicates a secondary feed-valve structure interposed at any convenient point between the train-pipe and the auxiliary reservoir; 9, a pipe forming a passage from the train-pipe to that valve; 10, a pipe forming a passage from that valve to the auxiliary reservoir, the pipes 9 and 10 thus forming a communicating passage between the train-pipe and the auxiliary reservoir; 14', a passage in valve 8 leading from the interior of piston chamber to the outer air to prevent air-cushioning; 11, a valve arranged in the passage thus formed between the train-pipe and auxiliary reservoir and loaded so as to tend to open and establish free communication from the train-pipe to the auxiliary reservoir; 12, a check-valve in that passage, opening toward the auxiliary reservoir; 13, a spring constituting, in the exemplification, the load upon valve 11 and tending to open that valve; and 14, a piston connected with the valve 11, and pressed upon by the air from the train-pipe, this air-pressure therefore tending to resist the spring and hold valve 11 in closed position.

The tension of spring 13 is to be so adjusted as to yield to normal pressure in the train-pipe and as to overcome the pressure in the train-pipe when somewhat below normal. Valve 11 will therefore be normally closed, and will open at certain reduction of pressure in the train-pipe.

Assume, now, that the brakes are off and all the conditions normal in the apparatus. In such case valve 11 will be closed and secondary feed ports 8, 9, and 10 will be without office. Assume, now, that the brakes are to be applied and that, accordingly, the usual reduction is made in train-pipe pressure. The triple-valve shifts as usual, the auxiliary reservoir discharges to the brake-cylinder as usual, the brakes go on as usual, the pressure in the auxiliary reservoir falls as usual, and that pressure continues to fall as usual so long as the brakes remain applied, if we ignore the secondary feed arrangement. But the reduction of pressure in the train-pipe permitted the preponderating load, represented by the spring 13, to open valve 11. This permits air to flow from the train-pipe to the auxiliary reservoir and maintain in the auxiliary reservoir a pressure equal to that in the train-pipe. It follows that the braking-pressure may be constantly maintained at the train-pipe pressure and that the system has all of the merits of a straight air system for long grades or rapid successions of brake applications.

It might at first glance be thought that the effect of the opening of valve 11, under the above conditions, would restore equilibrium at the triple-valve and cause that valve to shift to the brake-releasing position. But the triple-valve will not shift in equilibrium. It requires a preponderance of pressure to move it in either direction. It having shifted to brake-applying position by reducing the train-pipe pressure below the auxiliary reservoir pressure tending to shift it, a shifting of it to the other or brake-releasing position, requires that the train-pipe pressure shall act upon it with more than the auxiliary reservoir pressure which resists its shifting. Therefore, when the triple-valve has gone to brake-applying position, valve 11 may be opened and the train-pipe and auxiliary reservoir and brake-cylinder maintained constantly under a pressure but little below normal. But if normal pressure be restored in the train-pipe, then that pressure will overcome spring 13 and close valve 11 and thereupon train-pipe pressure may preponderate over auxiliary reservoir pressure and cause the triple-valve to shift to brake-releasing position. Briefly, the brake system has all of the merits of the automatic system and, in addition, without any manipulation whatever, it has all the merits of the straight air system in prolonged application of the brakes or in quick successive applications, the air acting direct at only such small reduction from the normal pressure as is represented by difference in pressure required to shift the triple-valve. In other words, train-pipe pressure acts continually to apply the brakes but if that pressure goes much above the normal the brakes will be released.

As valve 11 (in Fig. 2) can only be open when there is a reduced pressure in the train-pipe, it follows that an improper discharge from the auxiliary reservoir might take place if the train-pipe were broken, as when a train breaks in two. Check-valve 12 meets this contingency and insures against outflow from auxiliary reservoir.

Figure 3:
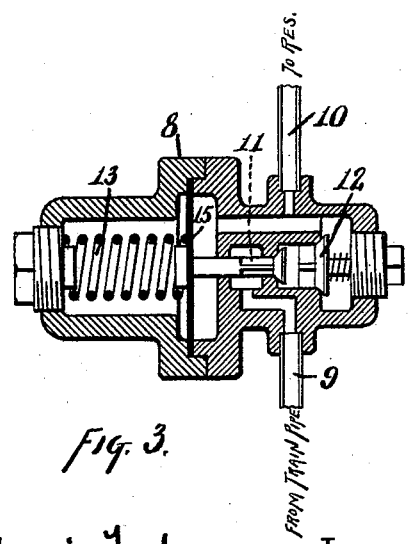

As valve 11 is held closed by normal pressure acting against the load which tends to open it, it is immaterial whether that normal pressure be received from the train-pipe or from the auxiliary reservoir. Fig. 3 shows an exemplifying modification in which pressure from the auxiliary reservoir tends to hold the valve closed, and the device in this figure also exemplifies another but equivalent method of causing the pressure, from whatever source received, to hold the valve closed against the load, the pressure in this case acting on diaphragm 15 instead of on a movable piston. The operation of the device of Fig. 3 is the same as that of Fig. 2. When the load represented by the spring is met by normal pressure, valve 11 is closed and the communication between the train-pipe and auxiliary reservoir is cut off. When the pressure meeting the load falls below normal the valve opens and the auxiliary reservoir may receive the full pressure that may be in the train-pipe, which pressure may be continuously maintained at or about normal train-pipe pressure.

In order to comprehend the working of my invention, it must be distinctly understood that in all automatic air brake apparatus the train-pipe feeds the auxiliary reservoir first, by reason of superior pressure in the train-pipe and second, by reason of high pressure in the train-pipe opening the feed-valve to the auxiliary reservoir; and also that high pressure in the train-pipe is the agent employed in releasing the brakes, the same high pressure that opens the feed-valve from the train-pipe to the auxiliary reservoir closing the communication between the auxiliary reservoir and the brake cylinder. It will therefore be obvious that in an apparatus thus limited the feeding of the auxiliary reservoir from the train-pipe is inconsistent with the applied condition of the brakes. In my improved apparatus I provide that the very reduction of train-pipe pressure which effects the application of the brakes (simultaneously and necessarily cutting off the usual communication between the train-pipe and the auxiliary reservoir) shall open a new passage of communication between the train-pipe and the auxiliary reservoir, through which new passage the air may flow whenever pressure in the auxiliary reservoir is less than the reduced pressure in the train-pipe. The controlled valve in this new passage does not open by virtue of the pressure in the train-pipe being superior to that in the auxiliary reservoir but by virtue of the pressure in the passage being reduced below a normal load tending to open the valve. It will therefore be seen that in the ordinary automatic brake normal pressure in the train-pipe means brakes off and feedway open from train-pipe to auxiliary reservoir and that reduced train-pipe pressure means brakes on and no communication between train-pipe and auxiliary reservoir; and it will be seen that in my improved system normal train-pipe pressure acts precisely as in the old system but that reduced train-pipe pressure permits of the possibility of air passing from train-pipe to auxiliary reservoir if the pressure in the auxiliary reservoir runs below that in the train-pipe.

In ordinary automatic air brakes the valve apparatus must perform three functions, viz., first, open or close communication between train-pipe and auxiliary reservoir, second, open or close communication from reservoir to brake cylinder, and third, open and close the exhaust of the brake cylinder. This valve apparatus with these three functions has, in common practice, been embodied in one valve structure and this structure has generally been termed the "triple-valve," and I exemplify my invention in connection with the ordinary and well known triple-valve. But if the three valve functions of the triple-valve instead of being performed in and by a single valve structure were performed by two or three separate structures, a question might arise as to whether the term "triple-valve" could then be properly applied to these two or three instrumentalities considered together.

Automatic air brake apparatus has been devised in which the three functions just referred to were performed by two separate structures, one structure performing only the opening and closing of communication between the train-pipe and the reservoir while the other structure performed the other two functions, the principle of action of the parts, however, being precisely as in an ordinary triple-valve. It is immaterial to a realization of my invention whether the three functions of a triple-valve are performed by a single veritable triple-valve or by separate instrumentalities.

I claim as my invention—

1. In a fluid pressure brake, the combination with a train-pipe, auxiliary reservoir, brake cylinder, and triple valve, of a direct or straight air passage from the train pipe to the brake cylinder, independent of the emergency passage, a supplemental or conversion valve, normally closed by fluid pressure, and automatically controlling the admission of air through said direct passage from the train pipe to the brake cylinder, and means substantially as described by which a fall in the fluid pressure below a determinate point opens said supplemental valve, and converts the operation from automatic to direct.

2. In a fluid pressure brake, the combination with a train pipe, auxiliary reservoir, brake cylinder and triple valve, of a passage between the train pipe and auxiliary reservoir independent of the charging passage, a supplemental or conversion valve controlling said passage and normally closed by fluid pressure and means substantially as described by which a fall in the fluid pressure below a determinate point opens said supplemental valve and converts the operation from automatic to direct.

3. In a fluid pressure brake, the combination with a train pipe, auxiliary reservoir, brake cylinder and triple valve, of a direct or straight air passage between the train pipe and the brake cylinder, independent of the emergency passage, a supplemental or conversion valve controlling said passage, a movable abutment exposed to fluid pressure normally closing said supplemental valve, and a load to open the valve upon a fall in the fluid pressure below a determinate point, whereby the operation is changed from automatic to direct.

4. In a fluid pressure brake, the combination with a train pipe, auxiliary reservoir, brake cylinder and triple valve, of a supplemental or conversion valve, normally closed by auxiliary reservoir pressure for automatically controlling the admission of air directly from the train pipe to the brake cylinder, and means substantially as described, by which a fall in reservoir pressure, below a determinate point opens said supplemental valve and converts the operation from automatic to direct.

5. In a fluid pressure brake, the combination with a train pipe, auxiliary reservoir, brake cylinder, and triple valve, of a passage between the train pipe and auxiliary reservoir, independent of the charging passage, a supplemental or conversion valve controlling said passage and normally closed by auxiliary reservoir pressure, and means substantially as described, by which a fall in reservoir pressure, below a determinate point opens said supplemental valve and converts the operation from automatic to direct.

6. The combination, substantially as set forth, with a train-pipe, an auxiliary reservoir, and a brake motor or cylinder, having pipe and valve connections, of a secondary feed passage between the train-pipe and the auxiliary reservoir, a valve in said passage held closed by normal pressure in the passage, and a load, as a spring, to open said valve in case the pressure in said passage becomes abnormally low.

7. The combination with the train-pipe, brake motor or cylinder, auxiliary reservoir, and valve, of a fluid pressure automatic brake apparatus, of a supplementary pipe-connection between the train-pipe and auxiliary reservoir, a valve in said connection opening toward the auxiliary reservoir, a movable abutment connected to the valve and exposed to the fluid pressure in the pipe connection to close the valve, and a load, as a spring or equivalent, tending to open the valve.

HARRIS TABOR.

Witnesses:
J. W. SEE,
JAS. FITTON.